Figure 1:
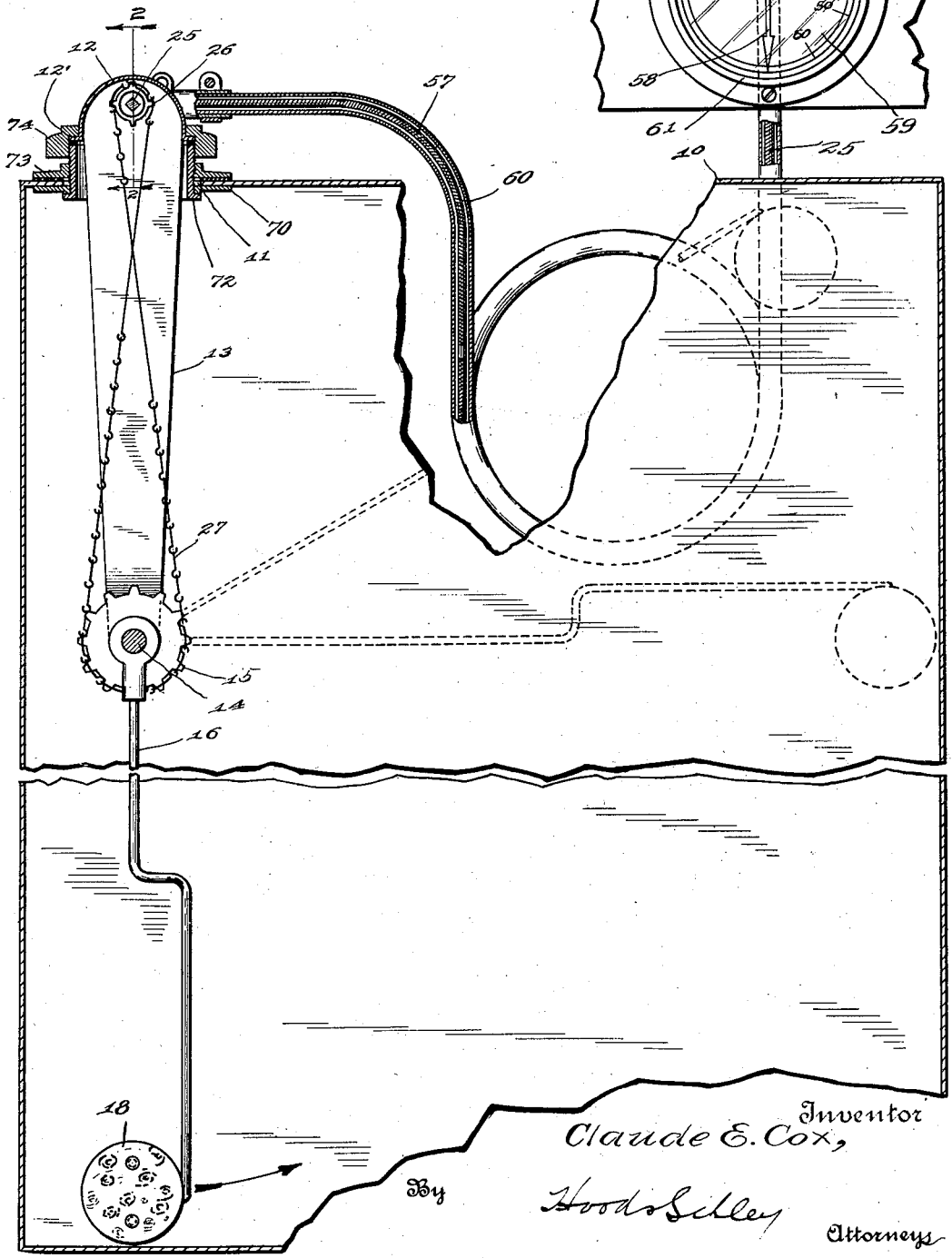

C. E. COX.
LIQUID LEVEL GAGE.
APPLICATION FILED MAR. 24, 1919.

1,375,131.

Patented Apr. 19, 1921.
2 SHEETS—SHEET 1.

Inventor
Claude E. Cox,
By
Hood Silley
Attorneys

C. E. COX.
LIQUID LEVEL GAGE.
APPLICATION FILED MAR. 24, 1919.
1,375,131.
Patented Apr. 19, 1921.
2 SHEETS—SHEET 2.
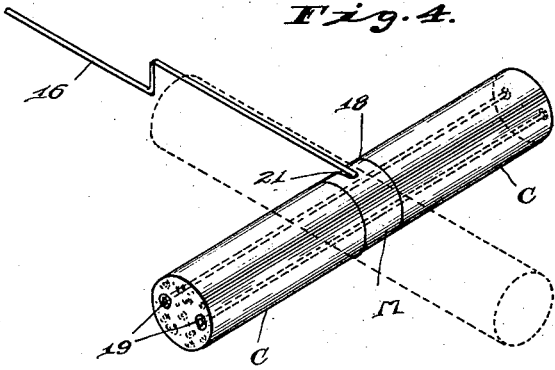
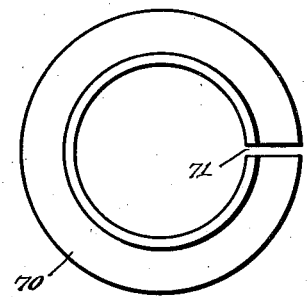
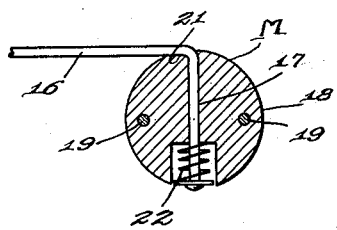
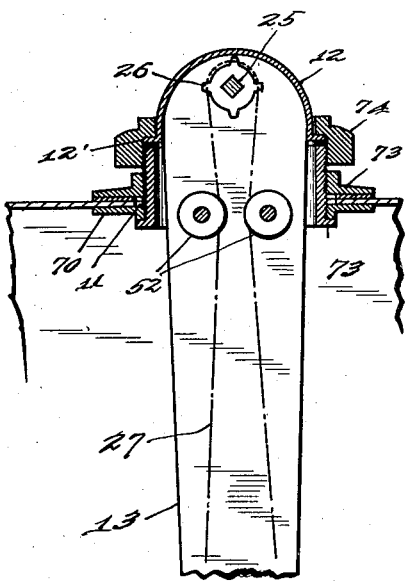
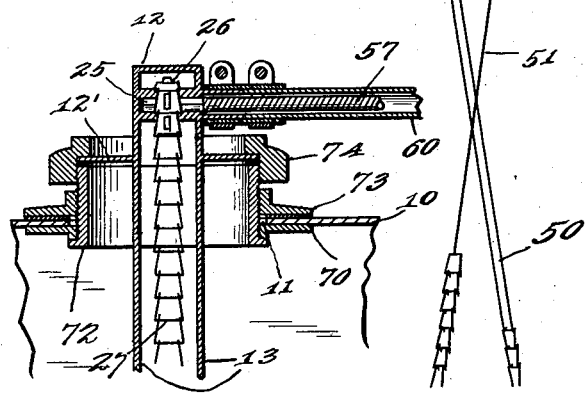
Witness
Frank A. Fahle
Inventor
Claude E. Cox,
By Hood & Selley
Attorneys

UNITED STATES PATENT OFFICE.

CLAUDE E. COX, OF DETROIT, MICHIGAN.

LIQUID-LEVEL GAGE.

1,375,131.  Specification of Letters Patent.  Patented Apr. 19, 1921.

Application filed March 24, 1919. Serial No. 284,666.

*To all whom it may concern:*

Be it known that I, CLAUDE E. Cox, a citizen of the United States, residing at Detroit, in the county of Wayne and State of Michigan, have invented a new and useful Liquid-Level Gage, of which the following is a specification.

In motor vehicles dependent upon liquid fuel, especially air ships and automobiles, it is important that the driver know the available fuel supply at all times, and, in most instances, it is desirable that the fuel reservoir be considerably removed from the driver. It is also desirable, and in many instances necessary, that the fuel be delivered under pressure from the reservoir.

The object of my invention is to provide a gage device of such character that its floating member may be readily mounted in and withdrawn from, a reservoir; that its gage member may be mounted at any desired point distant from the reservoir; that, while permitting the use of pressure to discharge the fuel from the reservoir, there shall be no need of packed moving members offering frictional resistance to movement of the float; and that differences in temperature at the reservoir and indicator may be compensated.

The accompanying drawings illustrate my invention. Figure 1 is a vertical section of an embodiment of my invention; Fig. 2 a section on line 2—2 of Fig. 1; Fig. 3 a similar section of a slight modification; Fig. 4 a perspective detail of the float and main operating arm; Fig. 5 a transverse section of the float; Fig. 6 a perspective detail of the crossed chain; and Fig. 7 a plan of the anchor ring.

In the drawings, 10 indicates a reservoir having a comparatively small opening 11 thereinto. Covering this opening is a cap 12, provided with a pair of legs 13 which support a shaft 14 at the lower ends. Attached to shaft 14 is a sprocket wheel 15 and a float-carrying arm 16, which carries at its outer end a finger 17, upon which is pivoted a float 18. Float 18 must have a considerable weight and buoyancy, in order to operate the various parts to be driven by wheel 15, and I have found it convenient to form the same of a central metal portion M and ends C, C of cork or other buoyant material attached by bolts or rivets 19. The central member M is pivoted upon finger 17, as shown in Fig. 5, and a light spring 22 is provided to normally hold the float 18 at right angles to arm 16, the arm 16 being seated in a shallow notch 21.

Float 18 has one cross-section, the dimensions of which are less than those of opening 11, while the flotation cross-section has one dimension considerably greater than the maximum dimension of opening 11, the arrangement being such, as already described, that the float may be shifted on the arm in such manner that when the arm is brought into alinement with legs 13 and float 18 swung to the position indicated in dotted lines in Fig. 4, the parts may be readily passed through opening 11.

Mounted in cap 12 is a shaft 25 carrying a sprocket wheel 26 which is preferably considerably smaller than wheel 15 in order that the working arc of movement of the arm 16 may result in a large arc of movement of shaft 20.

Connecting the two wheels 15 and 26 is a chain 27 and, in order to provide as large an arc of contact as possible on wheel 26, this chain is crossed, as shown in Figs. 1 and 6. To permit this crossing while at the same time avoiding a rubbing friction which would materially reduce the driving power of the float 18, I provide chain 27 with a long double link 50 through which is projected the long single link 51, these two links being so placed, relative to wheel 26, that the maximum desired movement of wheel 26 may be obtained without interference between said links. If desired, a straight arrangement of connecting chain, with suitable idlers 52, as shown in Fig. 3, may be provided.

Connected with shaft 25 is a flexible shaft 57 which leads to and is connected with the shaft of an indicator hand 58 traversing a dial 59.

In order to permit use of pressure within reservoir 10 without the need of packed journals around shaft 25, I inclose shaft 57 in a rigid sheath 60 which is connected by air-tight connections with cap 12 and the casing 61 within which hand 59 is mounted. By this means I am able to avoid that comparatively great frictional resistance to movement of the parts which would unavoidably be offered if any of the shafts had to pass through packed journals.

In view of the fact that temperature changes produce rotation of one end of a flexible shaft relative to the other end, and because the indicator is apt to be placed in a hotter place than the reservoir, I make the shaft 57 in two sections of opposite pitch, as shown, and make the normally hotter end shorter.

In order to make it possible to readily apply my device to existing reservoirs, I have provided the following construction. An anchor ring 70 of somewhat larger diameter than opening 11, is radially cut by a slot 71 preferably slightly wider than the thickness of the wall of reservoir 10, thus making it possible to pass the ring through opening 11. Sleeved through ring 70 is an anchor sleeve 72 exteriorly threaded to receive the clamping ring 73 and the clamping nut 74, said nut engaging a flange 12' of cap 12 and clamping it upon the upper end of the anchor sleeve 72.

The internal diameter of sleeve 72 is sufficient to permit the passage of wheel 15 and float 18 when it is swung to the position indicated by dotted lines in Fig. 4. It should be noted that in normal operation there is no pivotal action of float 18 on finger 17.

I claim as my invention:

1. In a gage, a variable-position member, a distant indicator member and a flexible shaft connecting said two members and comprising two opposite-pitch portions connected end to end to compensate temperature-effected angular movements of the shaft portions affecting the indicator.

2. In a liquid gage, a reservoir having an opening, a cap closing said opening and carrying driving connections projecting through said opening, and a float movably associated with said driving connections, said float having a flotation cross section one dimension of which is greater than said opening, and having another cross section permitting passage of the float through said opening.

3. In a liquid gage, a cap capable of association with an opening into a reservoir, an indicator-controlling member carried by said cap, a float supported by said cap and movable from its normal flotation position to be passable through said opening, and driving connections between the float and the indicator-controlling member carried by the cap.

4. In a liquid gage, a reservoir having an opening, a cap closing said opening and carrying driving connections projecting through said opening, a float movably associated with said driving connections, an arm to which said float is pivoted, said float having a flotation cross section, one dimension of which is greater than said opening and having another cross section permitting passage of the float through said opening when said float is moved into longitudinal alinement with said arm.

5. In a liquid gage, a cap associable with an opening into a reservoir by an air-tight connection, a shaft journaled in said cap, a leg carried by said cap and projecting through said opening, a shaft carried by said leg, connections between said shafts, a float-arm carried by the last-mentioned shaft, a float mounted on said arm, said float having a flotation position relative to said arm rendering it non-passable through the opening and being movable into an abnormal position relative to said arm rendering it passable through said opening, a sheathing leading to a distant point connected to said cap and communicating with the interior thereof by an airtight connection, a flexible shaft mounted in said sheathing and connected to the first-mentioned shaft, and an indicator at the distant point controlled by said flexible shaft.

6. In a liquid gage, a cap associable with an opening into a reservoir, a shaft journaled in said cap, a leg carried by said cap and projecting through said opening, a shaft carried by said leg, connections between said shafts, a float-arm carried by the last-mentioned shaft, and a float mounted on said arm, said float having a flotation position relative to said arm rendering it non-passable through the opening and being movable into an abnormal position relative to said arm rendering it passable through said opening.

7. In a liquid gage, a cap associable with an opening into a reservoir and having a leg projecting through said opening, a rock-shaft carried by said leg, an arm projecting from said rock-shaft, and a float movably mounted on said float, said arm having a dimension in its flotation plane exceeding dimensions of said opening and having other cross-sectional dimensions less than the dimensions of said opening, and shiftable on the arm to a position permitting passage through said opening.

8. The combination with a reservoir having an opening, of a radially split anchor ring of greater diameter than said opening but passable therethrough, an anchor sleeve having an outer-threaded portion projecting through said opening and an inner portion interlocking with the anchor ring to prevent outward withdrawal of the sleeve, a clamping ring coöperating with said sleeve and reservoir, a cap coöperating with said sleeve and carrying float-controlled members projectable through the opening, a clamping nut connecting said cap and sleeve, a sheath leading to a distant point and carried by said cap, and a driving member arranged in said sheath and connected with the float-controlled members, said sheath being air-tight and communicating freely with the interior of the cap.

9. The combination with a reservoir having an opening, of a radially split anchor ring of greater diameter than said opening but passable therethrough, an anchor sleeve having an outer-threaded portion projecting through said opening and an inner portion interlocking with the anchor ring to prevent outward withdrawal of the sleeve, a clamping ring coöperating with said sleeve and reservoir, a cap coöperating with said sleeve and carrying float-controlled members projectable through the opening, and a clamping nut connecting said cap and sleeve.

10. A flexible driving shaft comprising two sections arranged end to end, each formed of a spirally arranged member, the pitch of the spiral of one member being opposite to the pitch of the spiral of the other member and said members proportioned in lengths in accordance with the variation of temperature conditions in the space through which said shaft is extended.

11. In a liquid gage, a reservoir having an opening, a cap closing said opening and carrying driving connections projecting through said opening, a float movably associated with said driving connections, said float having a flotation cross section, one dimension of which is greater than said opening, and having another cross section permitting passage of the float through said opening when said float is moved into longitudinal alinement with its supporting arm, and a supporting arm to which said float is pivoted.

In witness whereof, I have hereunto set my hand at Chicago, Illinois, this 21st day of March, A. D. one thousand nine hundred and nineteen.

CLAUDE E. COX.